J. B. FOOTE.
MACHINE FOR STEMMING FRUIT.
APPLICATION FILED JUNE 8, 1914.

1,298,488.

Patented Mar. 25, 1919.
4 SHEETS—SHEET 1.

Witnesses:
John Endere
Mildred Stum

Inventor:
John B. Foote
By Fred Gerlach
his Atty.

J. B. FOOTE.
MACHINE FOR STEMMING FRUIT.
APPLICATION FILED JUNE 8, 1914.

1,298,488.

Patented Mar. 25, 1919.
4 SHEETS—SHEET 4.

UNITED STATES PATENT OFFICE.

JOHN B. FOOTE, OF OAK PARK, ILLINOIS.

MACHINE FOR STEMMING FRUIT.

1,298,488.  Specification of Letters Patent.  Patented Mar. 25, 1919.

Application filed June 8, 1914. Serial No. 843,654.

*To all whom it may concern:*

Be it known that I, JOHN B. FOOTE, a resident of Oak Park, in the county of Cook and State of Illinois, have invented certain new and useful Improvements in Machines for Stemming Fruit, of which the following is a full, clear, and exact description.

The invention relates to machines for stemming fruit, and more particularly fresh fruit which must not be abraded or pressed in removing the stems, such as cherries and similar fruit.

One object of the invention is to provide an improved fruit-stemming machine, which will handle or remove the stems from a large quantity of cherries. Another object of the invention is to provide an improved machine, which is efficient in removing both long and short stems from fruit. Another object of the invention is to provide an improved machine of this character which will remove the stems without marring or abrading the fruit.

Lastly, the invention designs to provide an improved machine for stemming fruit.

The invention consists in the several novel features hereinafter set forth and more particularly defined by claims at the conclusion hereof.

Figure 1:
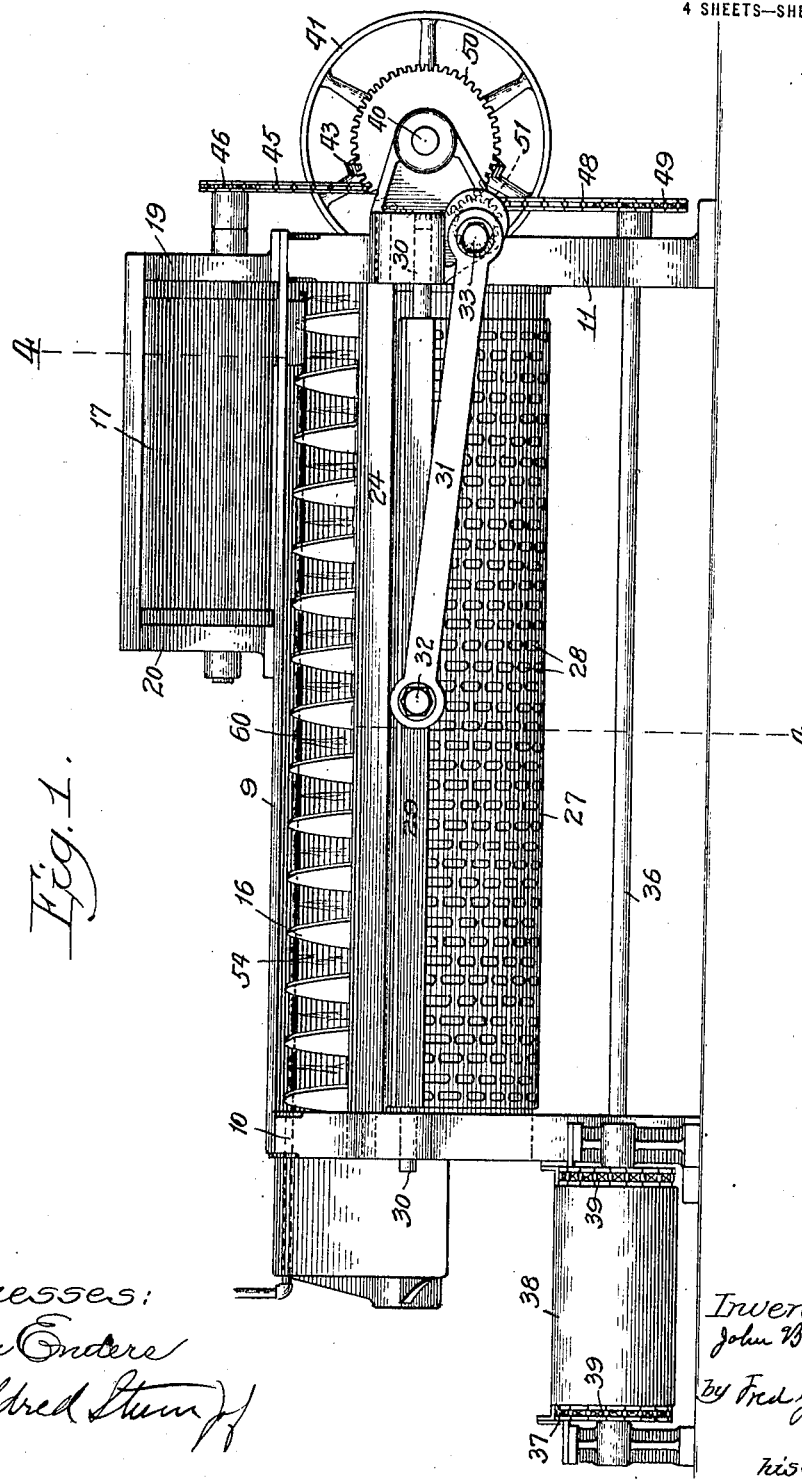
Figure 2:
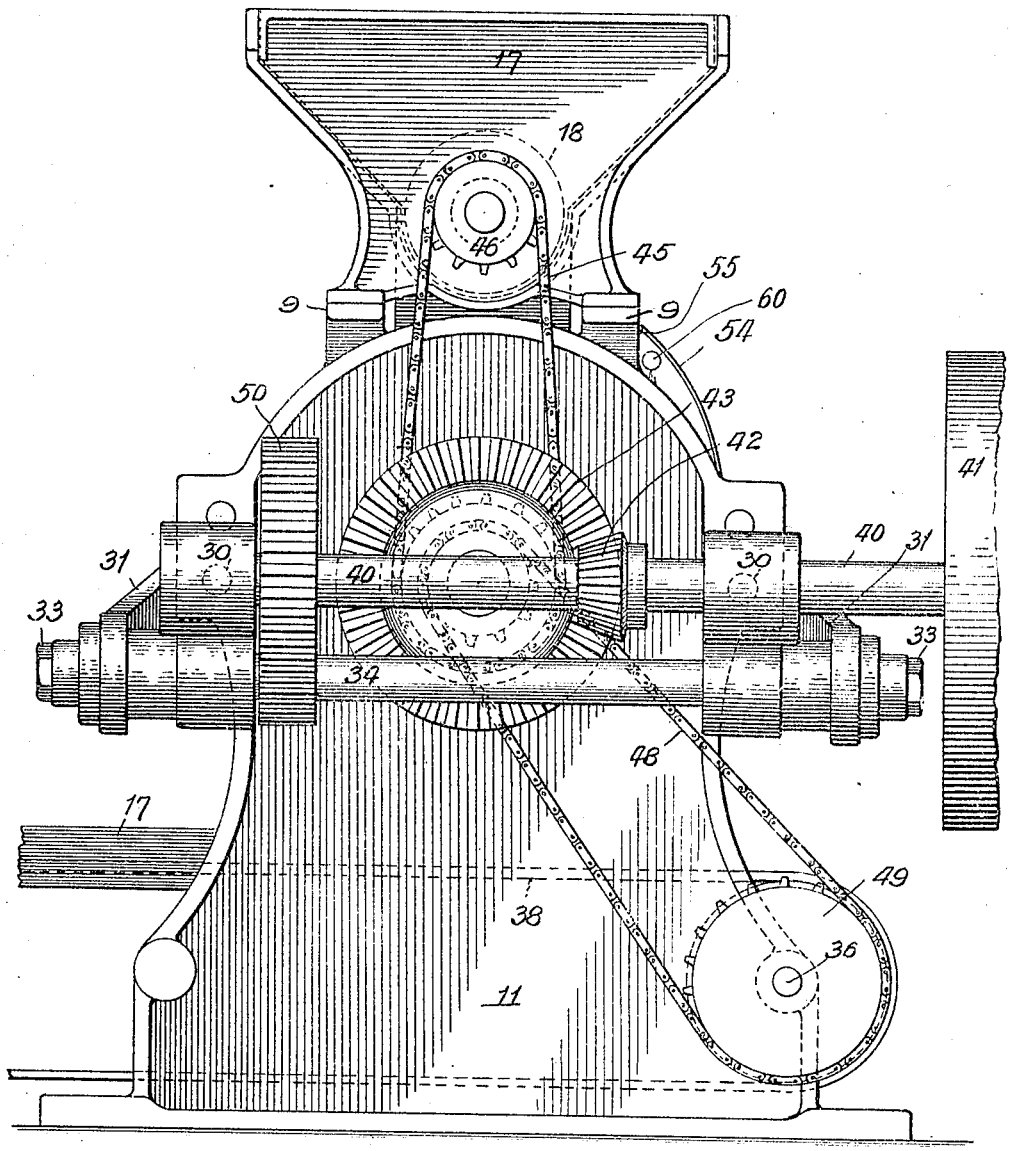
Figure 3:
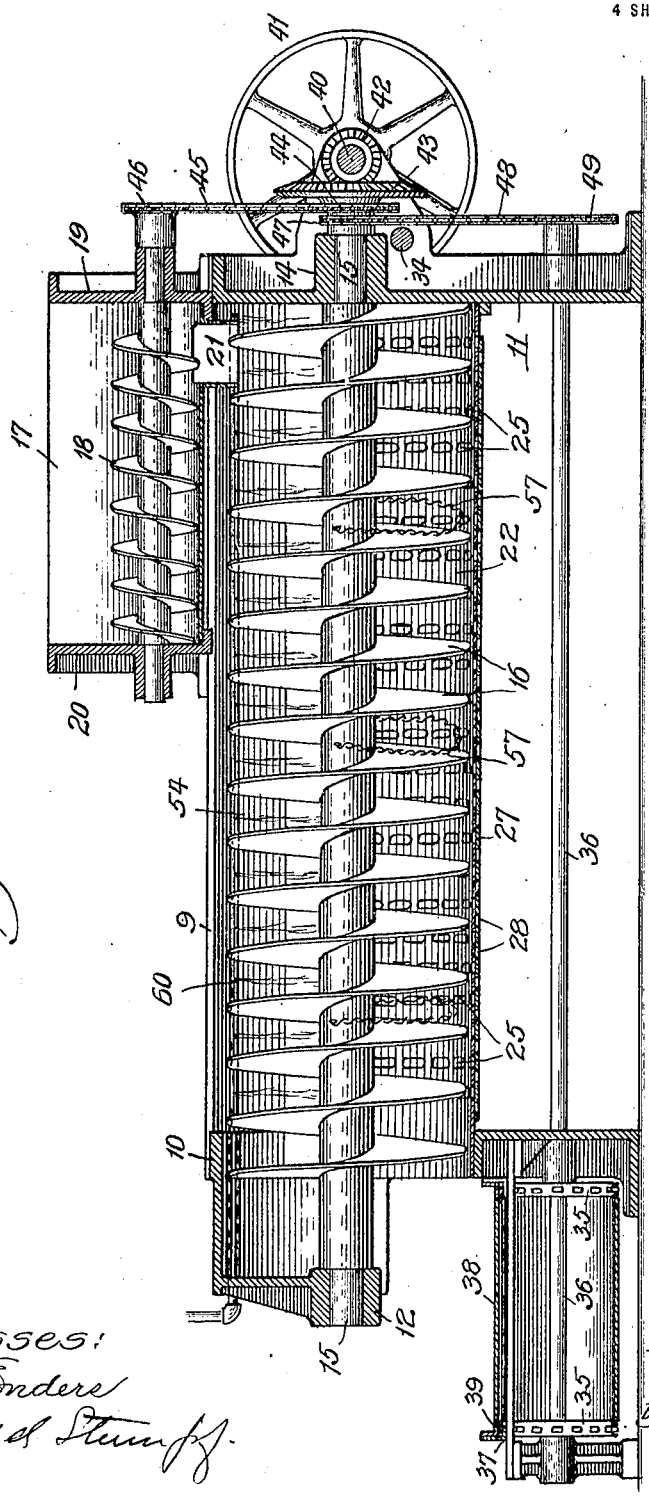
Figure 4:
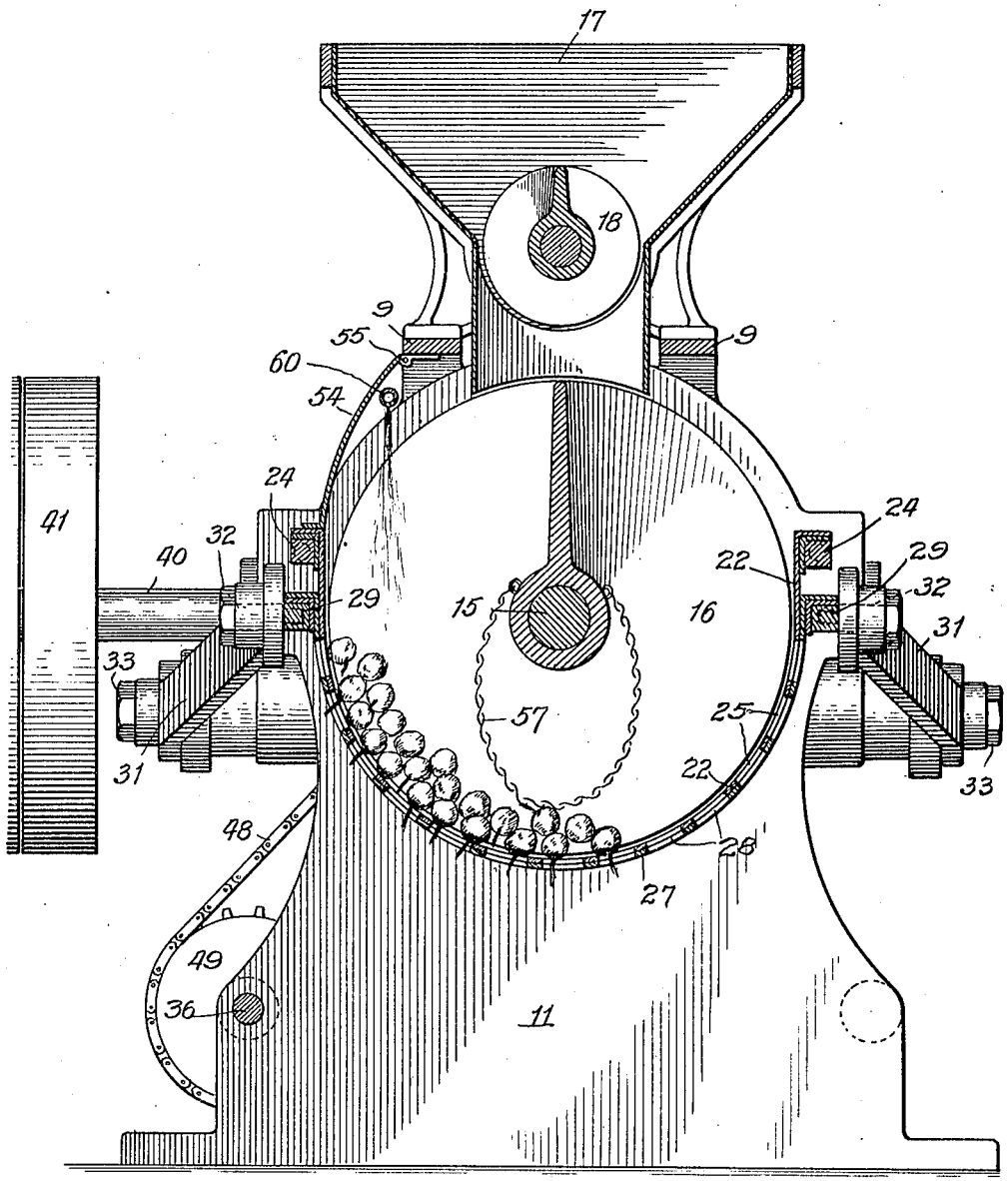

In the drawings: Figure 1 is a side elevation of a machine embodying the invention. Fig. 2 is an end elevation. Fig. 3 is a central longitudinal section. Fig. 4 is a cross-section taken on line 4—4 of Fig. 1.

The supporting-means of the machine comprises end frames 10 and 11, which are connected together by bars 9 and provided with bearings 12 and 14, respectively, for a shaft 15 which carries a helical or screw-conveyer 16 whereby the fruit will be fed longitudinally through the machine.

A hopper 17, which is adapted to receive the fruit in bulk, is mounted on bars 9 above the conveyer 16. A helical or screw-conveyer 18 is journaled in the end-frames 19 and 20 of hopper 17, to feed the fruit in regulated quantity through a discharge duct 21 in one end of the hopper 17. The screw-conveyer 18 agitates the fruit in the hopper and is driven at the desired speed to feed the fruit in regulated quantity, as fast as necessary to keep the stemming mechanism supplied with fruit. Duct 21 is disposed to deliver the fruit to the inlet end of the conveyer 16. Conveyer 16 operates in a trough 22 formed by curved or semi-cylindrical plate which is supported at the sides of the conveyer-screw upon bars 24 which are suitably secured in the end-frames 10 and 11. The trough-plate 22 is formed with series of openings 25, which are elongated in the direction of the rotation of this conveyer 16, to receive the projecting stems of the fruit which is fed longitudinally through the trough by the blades of the conveyer 16. The fruit, besides being conveyed longitudinally through the trough by the screw, will be tumbled or frictionally rolled upwardly and toward one side of the trough by the blade of helical conveyer 16. As a result of this operation, the stems of the fruit, in being fed through the trough, may pass into the perforations adjacent the bottom of the trough and also into the perforations at the side of the vertical plane extending through the axis of the screw.

In some instances, the tumbling action and forward movement of the fruit, resulting from the operation of the helical conveyer, and the passing of the stems in the perforations 25, is sufficient to remove long stems passing through the perforations 25. In many cases, however, removal of the stems by the perforations in the trough 22, cannot be relied upon, and to insure the removal of all the stems, a cylindrical plate 27 is fitted on the outside of trough-plate 22 and has perforations 28 therein, similar and corresponding to the perforations 25 in plate 22, to coact with the stationary trough-plate in gripping the stems. Plate 27 is secured to bars 29 which have terminals 30 slidably mounted in guide-holes formed in end-frames 10 and 11 respectively.

Reciprocating motion is imparted to the plate 27 by pitmen 31 which are pivoted respectively, to the side-bars 29 at 32 and to eccentric or crank-portions 33 of a shaft 34. In the reciprocation of plate 27, the holes 28 pass into registry with the holes 25 in the stationary plate when the stems may pass through the holes in both plates, and when the said holes pass out of registry, the stems will be gripped between the edges of the openings in the plates during movement of plate 27 in either direction. These plates are formed, not to clip off the stems between them, but so they will sufficiently grip the stems, which under the influence of movement imparted to the fruit by the conveyer 16, will be retarded or held while the fruit is being moved forwardly in the trough, thus causing the fruit and stems to be separated. Loops of chain 57 may, if desired, be secured to the shaft of conveyer 16, to agitate the fruit in transit through the trough. The fruit is moved longitudinally of the trough until it is discharged from one end thereof, onto an endless belt 38 which may be of usual construction and on which the fruit may be inspected, if desired, and whereby the fruit will be carried to any desired point of delivery. This belt 38 is secured to chains 39 driven by sprocket-wheels 35 on a shaft 36. The chains 39 travel on a suitable track 37, as well understood in the art. The end frame 10 is extended to overlie a portion of the inspection-belt 38 and is open at its bottom, so that the fruit, when discharged from the trough by conveyer 16, will be delivered onto the said belt.

The stems pass through the perforations in plates and drop beneath the machine.

A drive-shaft 40 is mounted in the end-frame 11 and is driven by a pulley 41. A beveled pinion 42 on said shaft meshes with a gear 43 which is secured to shaft 15 to drive the helical conveyer 16. A sprocket-wheel 44, driven by a gear 43, drives a chain 45 and a sprocket-wheel 46 on the shaft of the feed-screw 18 to operate said screw. A sprocket 47 also rotating with gear 43, drives a chain 48 which drives a sprocket 49 on shaft 36, which drives the inspection-belt. A gear 50 on shaft 40, drives a pinion 51 on eccentric-shaft 34 to operate the crank-pins to which pitmen 31 are connected.

A guard 54 is pivoted, as at 55, to one of the frame-bars 9 and extends downwardly to one side of the trough-plate 22 to prevent the fruit from being thrown over the side of the trough.

A spray-pipe 60, connected to a suitable water supply, is disposed to discharge water onto the conveyer 16 to prevent it from becoming gummed or sticky from the juice of the fruit.

The invention thus exemplifies a machine for removing the stems of fresh fruit, which is adapted to handle large quantities of fruit. The perforated trough and the co-acting perforated reciprocating plates are very effective in removing the stems from the fruit, because of the large active area of the perforated trough which results in the stems of the fruit being gripped and separated from the fruit at one time or another before the fruit is finally discharged from the trough. The machine is simple in construction and has a large capacity. The hopper from which the feed-screw supplies the fruit in regulated quantities to the stemming trough, is adapted to receive the fruit in bulk, so that the machine is entirely automatic in removing the stems from fruit.

The invention is not to be understood as restricted to the details set forth, since these may be modified, within the scope of the appended claims, without departing from the spirit and scope of the invention.

Having thus described the invention, what I claim as new and desire to secure by Letters Patent, is:

1. In a machine for stemming fruit, the combination of a stationary trough, having perforations therein, means for conveying the fruit longitudinally through the trough, and means for gripping the stems passing through said perforations to cause the stems to be severed by the movement of the fruit relatively to the trough while the stems are held by the gripping means.

2. In a machine for stemming fruit, the combination of a perforated stationary plate forming a trough, means for conveying the fruit longitudinally through the trough, and means for gripping the stems passing through said perforations to cause the stems to be severed by the movement of the fruit relatively to the trough while the stems are held by the gripping means.

3. In a machine for stemming fruit, the combination of a stationary trough having perforations in and above the bottom, means for conveying the fruit longitudinally through the trough, and means for gripping the stems passing through said perforations to cause the stems to be severed by the movement of the fruit relatively to the trough while the stems are held by the gripping means.

4. In a machine for stemming fruit, the combination of a curved stationary plate having perforations therein, forming a trough, means for conveying the fruit longitudinally through the trough, and means for gripping the stems passing through said perforations to cause the stems to be severed by the movement of the fruit relatively to the trough while the stems are held by the gripping means.

5. In a machine for stemming fruit, the combination of a trough, having perforations therein, means for conveying the fruit longitudinally through the trough, and correspondingly perforated means for gripping the stems passing through the trough.

6. In a machine for stemming fruit, the combination of a perforated plate forming a trough, means for conveying the fruit longitudinally through the trough, and a perforated plate coacting with the perforated trough to grip the stems.

7. In a machine for stemming fruit, the combination of a trough, having perforations in and above bottom, means for conveying the fruit longitudinally through the trough, and a correspondingly perforated plate coacting with the perforated trough to grip the stems.

8. In a machine for stemming fruit, the combination of a curved perforated plate forming a trough, means for conveying the fruit longitudinally through the trough, and a correspondingly curved perforated plate coacting with the trough to grip the stems.

9. In a machine for stemming fruit, the combination of a stationary trough having perforations therein, a helical conveyer extending longitudinally through the trough, for moving the fruit from end to end thereof, and means for gripping the stems passing through said perforations to cause the stems to be severed from the fruit by the movement of the fruit in the trough while the stems are being held by the gripping means.

10. In a machine for stemming fruit, the combination of a stationary plate having perforations therein, forming a trough, a helical conveyer extending longitudinally through the trough, for moving the fruit from end to end thereof, and means for gripping the stems passing through said plate to cause the stems to be severed from the fruit by the movement of the fruit in the trough while the stems are being held by the gripping means.

11. In a machine for stemming fruit, the combination of a curved stationary trough having perforations in and above bottom, a helical conveyer extending longitudinally through the trough for moving the fruit from end to end thereof, and means for gripping the stems passing through said perforations to cause the stems to be severed from the fruit by the movement of the fruit in the trough while the stems are being held by the gripping means.

12. In a machine for stemming fruit, the combination of a curved stationary plate having perforations therein, forming a curved trough, a helical conveyer extending longitudinally through the trough, for moving the fruit from end to end thereof, and means for gripping the stems passing through said perforations to cause the stems to be severed from the fruit by the movement of the fruit in the trough while the stems are being held by the gripping means.

13. In a machine for stemming fruit, the combination of a trough having perforations therein, means for conveying the fruit longitudinally through the trough, means for gripping the stems passing through the perforations in the trough, and mechanism for reciprocating the gripping-means.

14. In a machine for stemming fruit, the combination of a trough, having perforations therein, a helical conveyer for moving the fruit longitudinally through the trough, means for gripping the stems passing through the trough, and mechanism for reciprocating the gripping means.

15. In a machine for stemming fruit, the combination of a curved trough having perforations therein, means for conveying the fruit longitudinally through the trough, a correspondingly curved perforated plate for gripping the stems passing through the trough, and mechanism for reciprocating the gripping plate.

16. In a machine for stemming fruit, the combination of a trough having perforations therein, means for conveying the fruit longitudinally through the trough, means for gripping the stems passing through the perforations, and mechanism for reciprocating the gripping-means longitudinally of the trough.

17. In a machine for stemming fruit, the combination of a plate having perforations therein and forming a trough, a helical conveyer extending longitudinally through the trough for conveying the fruit from end to end thereof, and a perforated plate for gripping the stems passing through the trough.

18. In a machine for stemming fruit, the combination of a curved plate having perforations therein and forming a trough, a helical conveyer extending longitudinally through the trough for conveying the fruit from end to end thereof and a curved perforated plate for gripping the stems passing through the trough.

19. In a machine for stemming fruit, the combination of a plate having perforations therein and forming a trough, a helical conveyer extending longitudinally through the trough for conveying the fruit from end to end thereof, a perforated plate for gripping the stems passing through the trough, and mechanism for reciprocating one of the plates.

20. In a machine for stemming fruit, the combination of a curved plate having perforations therein, and forming a trough, a helical conveyer extending longitudinally through the trough for conveying the fruit from end to end thereof, a curved perforated plate for gripping the stems passing through the trough, and mechanism for reciprocating one of said plates.

21. In a machine for stemming fruit, the combination of a stationary trough, a helical conveyer for moving the material longitudinally through the trough, said trough having perforations into which the stems may pass, and rotary-means having surfaces formed to engage the fresh fruit in the trough and agitating the fruit without abrading or crushing it.

22. In a machine for stemming fruit, the combination of a perforated trough, a helical conveyer for moving the material longitudinally through the trough, rotary-means for agitating the fruit in the trough, and means for gripping the stems passing through the trough.

JOHN B. FOOTE.

Witnesses:
MILDRED STUMPF,
KATHARINE GERLACH.

Copies of this patent may be obtained for five cents each, by addressing the "Commissioner of Patents, Washington, D. C."